United States Patent [19]

Arnaud

[11] Patent Number: 5,605,173
[45] Date of Patent: Feb. 25, 1997

[54] LIQUID DISTRIBUTION OPERABLE BY SOLENOID VALVES

[75] Inventor: Gérard Arnaud, Beausoleil, France

[73] Assignee: Eaton Corporation, Cleveland, Ohio

[21] Appl. No.: 344,436

[22] Filed: Nov. 23, 1994

[30] Foreign Application Priority Data

Dec. 1, 1993 [FR] France .................................. 93 14623

[51] Int. Cl.$^6$ .................................................. F16K 11/24
[52] U.S. Cl. .............................. 137/7; 137/597; 137/882; 137/883; 251/129.02
[58] Field of Search .................................. 137/882, 883, 137/597, 119, 7; 251/129.02, 30.04

[56] References Cited

U.S. PATENT DOCUMENTS

| | | | |
|---|---|---|---|
| 3,392,747 | 7/1968 | Waldrop | 137/597 X |
| 3,989,222 | 11/1976 | Yoshiyasu | 251/30.04 |
| 4,270,570 | 6/1981 | Kolze | 137/597 |
| 4,280,532 | 7/1981 | Bible et al. | 137/882 |
| 4,444,215 | 4/1984 | Zukausky | 137/597 X |
| 4,495,968 | 1/1985 | Kist | 137/883 X |

*Primary Examiner*—Stephen M. Hepperle
*Attorney, Agent, or Firm*—Roger A. Johnston

[57] ABSTRACT

Water enters a common manifold at one or more individually line valved inlet ports, and is routed selectively by direct acting type solenoid operated valves to plural exit ports from the manifold.

One exit port solenoid valve is normally open and the solenoid valves for each of the other exit ports are normally closed. For instance valve 5a controls all three ports 3a–3c.

The line valves are closed thus lowering the pressure within manifold 1, whenever any one or more of exit valves is to be actuated—i.e., closing the normally open or opening the normally closed valves which are low force directing acting.

If desired, the normally open (N.O.) exit valve may have a small central hole in the moveable valve poppet for allowing a pilot flow for lowering of pressure, when this normally open valve is in the closed position and is to be allowed to open without requirement for a very strong return spring 21. The N.O. valve solenoid armature has a head portion received in a cavity in the poppet; and the had portion is operative for limited lost motion with respect to the poppet for opening the pilot passage which lowers the manifold pressure permitting the return spring to re-open the N.O. valve. The manifold may have an automatic pressure release device 9 and there may be flow regulators and/or filters 16 associated with the inlet valves 15, 18.

8 Claims, 3 Drawing Sheets

LIQUID DISTRIBUTION OPERABLE BY SOLENOID VALVES

BACKGROUND OF THE INVENTION

The present invention concerns a distributor for liquids, more specifically water, enabling a flow of liquid to be conveyed selectively towards a number of outlets. Insofar as it also comprises two or more inlets, the distributor can also act as a mixer.

Distributors of this type are specifically used in household electrical devices such as washing machines and dishwashers in order to convey the water, whenever needed, towards one or the other of two or more outlets, Known liquid distributors used in this field at present are able to dispense a flow of liquid from 0.3 to 20 liters of water per minute at a pressure ranging from 0.2 to 10 bars. These known liquid distributors are equipped with pilot operated electrically driven valves, which make them complicated, cumbersome and costly because of the need to add the pilot operator elements to each electrical valve.

SUMMARY OF THE INVENTION

The present invention aims to overcome these drawbacks by providing a differently conceived distributor for liquids, operating by means of directly acting electrically energized valves, hence simpler, more compact and cheaper, whilst giving a very satisfactory operation.

To this end, it is a specific purpose of the present invention to provide a liquid distributor operated by electrical valves, comprising at least one inlet for the liquid and at least two outlets, apt to communicate selectively with the inlet(s), the distributor being associated, at the various outlets for the liquid, with normally open electrical valves and/or with normally closed electrical valves, all of them acting directly, whilst at each inlet for the liquid there is associated a control valve, provided to cut off the flow of pressurized liquid upstream of the inlet before the electrical valves associated with the outputs for the liquid are selectively activated.

The operating principle of the distributor comprises the cutting off of the liquid arriving from upstream by means of an ordinary or safety control valve, causing the various electrical valves of the distributor to become open or closed, depending on the outlets used at the time, and then re-opening said control valve in order to allow the liquid to flow out of the wanted outlet(s) whilst flowing through the body of the distributor.

When the distributor according to the invention comprises at least two inlets for the liquid, each having an associated control valve, respectively, the distributor can act as a mixer.

The control valve or each control valve associated with an inlet for the liquid distributor can be an electrical valve. It can also be a different type of valve, such as a mechanically, magnetically or pneumatically controlled valve.

At least some of the outlets for the liquid can be provided with flow regulators.

The liquid distributor according to the invention is advantageously equipped with a relief valve, preferably adjustable, mounted on the distributor body to limit the pressure of the liquid inside the body itself. Thanks to the relief valve, the residual pressure inside the distributor body (at the time when the directly acting electrical valves are operating) is low, thus allowing the electrical valves to work well. Additionally, the relief valve enables the liquid distributor to be made of a material whose resistance against breakage is just sufficient to withstand the residual pressure, hence the distributor can be made economically. A further advantage of the relief valve is the fact that one electrical valve can be dispensed with, by using the liquid flowing through this relief valve to feed one of the outlets for the liquid, thus obtaining further simplicity and savings.

According to another feature of the invention, the liquid distributor comprises at least one directly acting electrical valve, namely a normally open electrical valve associated with an outlet for the liquid, whose sealing element is provided with a small central opening apt to be closed or opened by the head of the moving core of the electrical valve, thus enabling the electrical valve to return to a rest position, notably under the effect of its own return spring, even when the residual pressure inside the distributor body is high. This arrangement enables the electrical valve to be opened in two steps and without fail, by providing an initial leakage through the small hole in the valve sealing element, even when the element is pressed against the corresponding outlet opening with such force that the return spring of the electrical valve does not manage to displace it. Hence the liquid distributor can always be restored to its working position.

Specifically, the liquid distributor which is an object of the present invention is a water distributor for household electrical goods, such as washing machines and dish washers, the electrical valves being driven by the machine program control unit as required.

In any case, the invention will be better understood from the description given below, with reference to the accompanying diagrammatic drawings showing, by way of non-limiting example only, a preferred embodiment of the liquid distributor.

BRIEF DESCRIPTION OF THE DRAWINGS

FIG. 3 is a partial enlarged view, in cross section, of a detail of the electrical valve of the water distributor;

DETAILED DESCRIPTION

Figure 1:
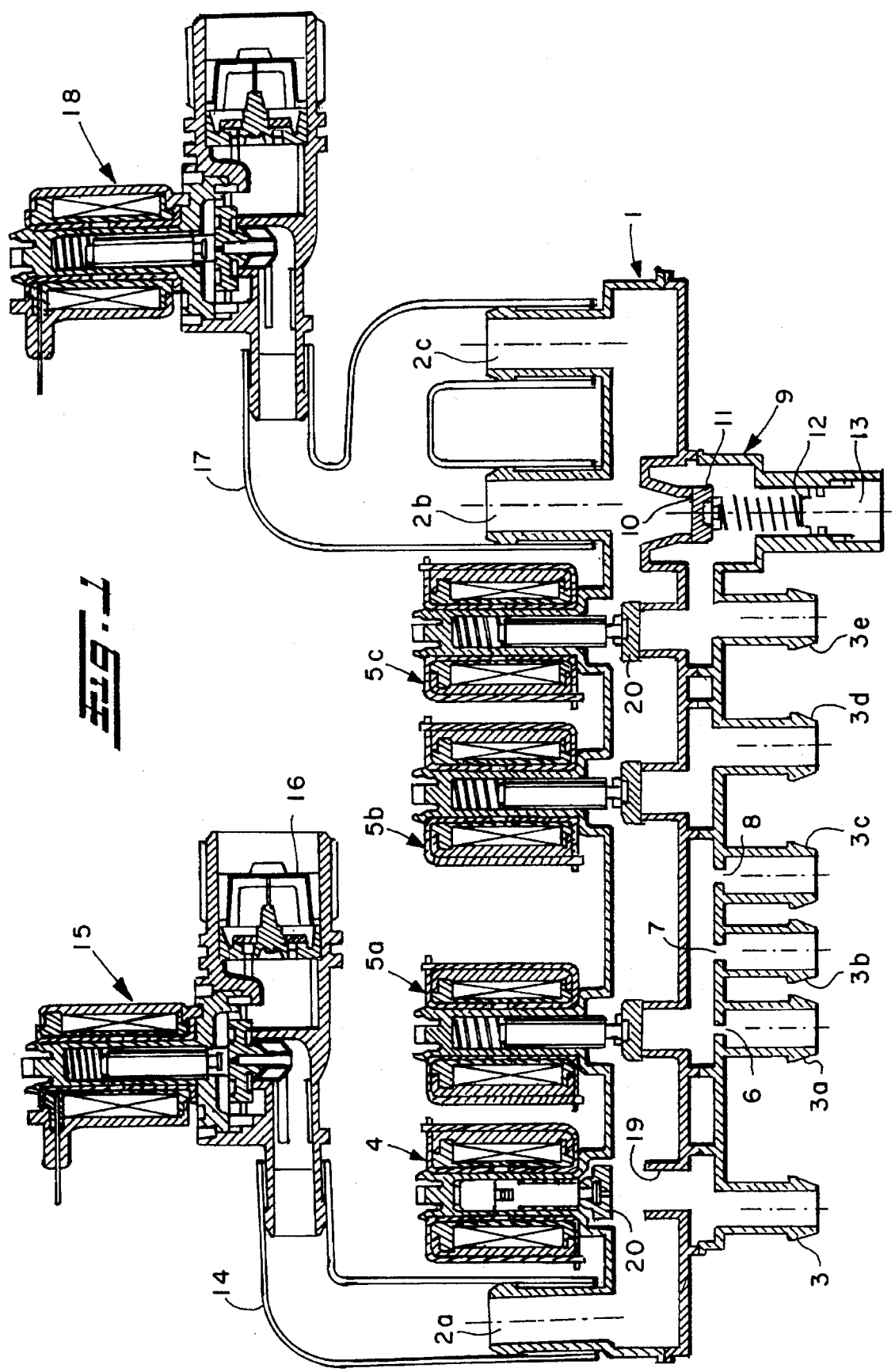
FIG. 1 is an overall view, in cross-section, of the water distributor according to the present invention, in a first position of use.
Figure 2:
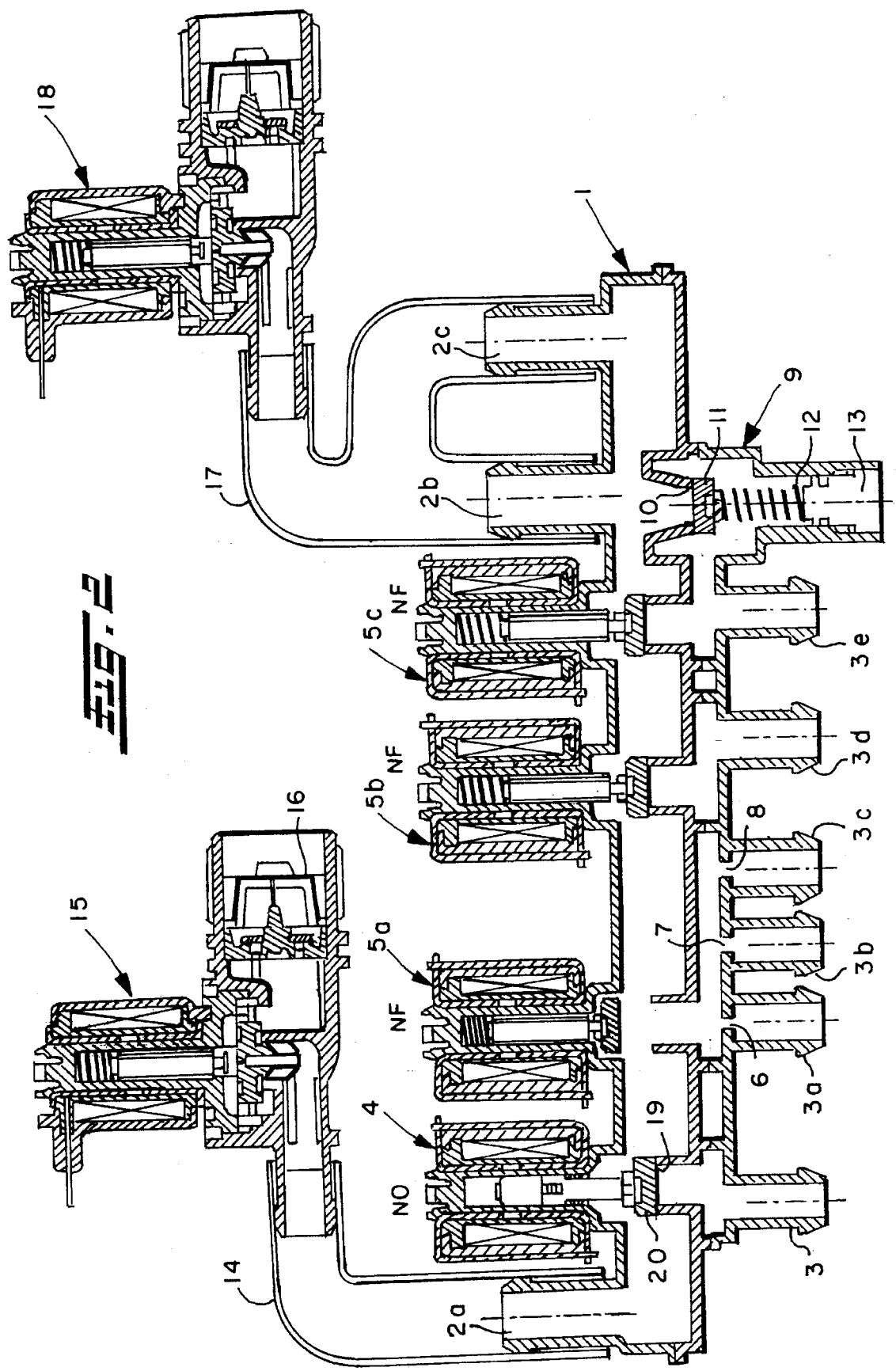
FIG. 2 is a similar view to that of FIG. 1, showing the same water distributor in a second position of use.

The water distributor, shown as a whole in FIGS. 1 and 2, comprises a hollow body or manifold indicated generally at 1 preferably elongated as shown if FIGS. 1 and 2 provided on one side with a number of water inlets, namely three water inlets denoted 2a, 2b and 2c in the embodiment considered. On the opposite side, the water distributor is provided with multiple water outlets 3, 3a, 3b, 3c, 3d and 3e, preferably consisting of a set of tubular nozzles attached to the body 1.

At the water outlets, there are associated directly acting electrically energized, e.g., solenoid operated, valves, either normally open as in the case of the electrical valve denoted generally by reference numeral 4 which is associated with the first outlet 3, or the valve may be normally closed such as the electrical valves denoted by reference numerals 5a, 5b and 5c and which are associated with the other water outlets, for example in the following arrangement:

a normally closed first electrical valve 5a is associated with the three water outlets 3a, 3b and 3c.

a normally closed second electrical valve 5b is associated with the water outlet 3d.

a normally closed third electrical valve 5c is associated with the last water outlet 3e.

The electrical valves indicated generally at 4, 5a, 5b and 5c are directly mounted on the body 1 of the water distributor.

Some of the water outlets, such as 3a, 3b and 3c are equipped with flow regulators denoted by reference numerals 6, 7 and 8, respectively, provided in the form of gauged openings, Under the body 1 of the water distributor there is mounted a relief valve indicated generally at 9 fitted on an opening 10 of the body 1. The relief valve 9 comprises an element 11 usually fitted against the rim of the opening 10 by a spring 12 which rests on a screwable adjustable device 13.

The first water inlet 2a is joined to an inlet pipe 14, fitted with a safety valve indicated generally at 15, which can be electrically, mechanically, magnetically or pneumatically controlled, and which, in this case, is an electrical valve associated with a filter and/or a flow regulator 16 disposed preferably in the inlet as shown in FIG. 2.

The other two water inlets 2b and 2c, which are also assumed to be in use, are joined to a common inlet pipe 17 fitted with another valve functioning as a line or safety valve and indicated generally at 18 and which may be identical to the one previously described.

In order to function, that is to say in order to enable the water outlets 3, 3a, ... 3e in use at a specific time to be selected, the water pressure inside the body 1 of the water distributor must be nil or lower than 0.1 bar (these values are merely indicative). To this end, the water arriving under pressure inside the body 1 is cut off upstream by closing the safety line or valve 15 (or on the safety valves 15 and 18 in case of multiple water inlets).

Subsequently, each of the electrical valves 4, 5a, 5b and 5c is placed, that is to say selectively energized or de-energized, in the required position in order to close or open the corresponding water outlets 3 to 3e. Subsequently, the safety valve 15 (or the safety valves 15 and 18) are opened enabling the water to flow out freely from the desired outlets.

Specific examples of operation are shown in FIGS. 1 and 2.

In the arrangement of FIG. 1, the electrical valves 4, 5a, 5b and 5c are shown de-energized or not operated (engaged position as they are not fed by an electric current). As the electrical valve 4 is the only one normally open, the opening of the safety valve 15 causes the water to flow out only through outlet 3 of the distributor.

In the arrangement of FIG. 2, the electrical valves 4 and 5a are the only ones to be fed by an electric current, and hence made to operate, whereas the other electrical valves 5b and 5c remain inactive. Referring to FIG. 2 when the safety valve 15 is opened, the liquid flows out of the outlets 3a, 3b and 3c of the distributor and the flow can be adjusted at each outlet by providing the desired size for the regulators 6, 7 and 8.

If the water pressure inside the body 1 of the distributor is too high, a hydraulic force is exerted on the element 11 of the relief valve 9 overcoming the action of a spring 12, thus causing the spring 12 to be compressed and the element 11 to go backwards, i.e., downwards in FIGS. 1 and 2, coming away from the rim of the opening 10. As a result, liquid flows through the opening 10 and the outlet 3e, hence the pressure inside the body 1 of the distributor decreases. When the pressure has decreased to a previously chosen value (set by adjusting the relief valve 9 by means of an adjustment member 13), the relief valve 9 closes again and inside the body 1 of the distributor there is established a reduced pressure, known as residual pressure, which does not exceed the fixed chosen value.

If, for whatever reason, one of the normally closed electrical valves 5a, 5b and 5c does not function, whereas, simultaneously, the normally open electrical valve 4 operates and therefore closes the corresponding outlet 3, the pressure rises inside the body 1 of the distributor until the relief valve 9 is opened. Subsequently, should the residual pressure be higher than a certain value, on the order of 0.2 bars, the water distributor is no longer able to operate. In practice, when the residual pressure is too high, and as a result of the force exerted by such pressure on the sealing elements of the electrical valves 4, 5a, 5b and 5c, the electrical valves do not have enough power to overcome the force of such pressure, this being specifically the case of the normally open electrical valve 4 when it is in the closed position. As far as the electrical valve 4 is concerned, in order to free the opening 19 which is sealed by its element 20, when the valve is in the closed position, it is necessary for a lifting force, equalling at least the pressure force, to be exerted on the sealing element 20 by the return spring 21, such force being the product of the residual pressure and the cross section of the opening 19; and, where the pressure is excessive the return spring 21 of the electrical valve 4 may not be sufficient to exert such traction force.

Figure 4:
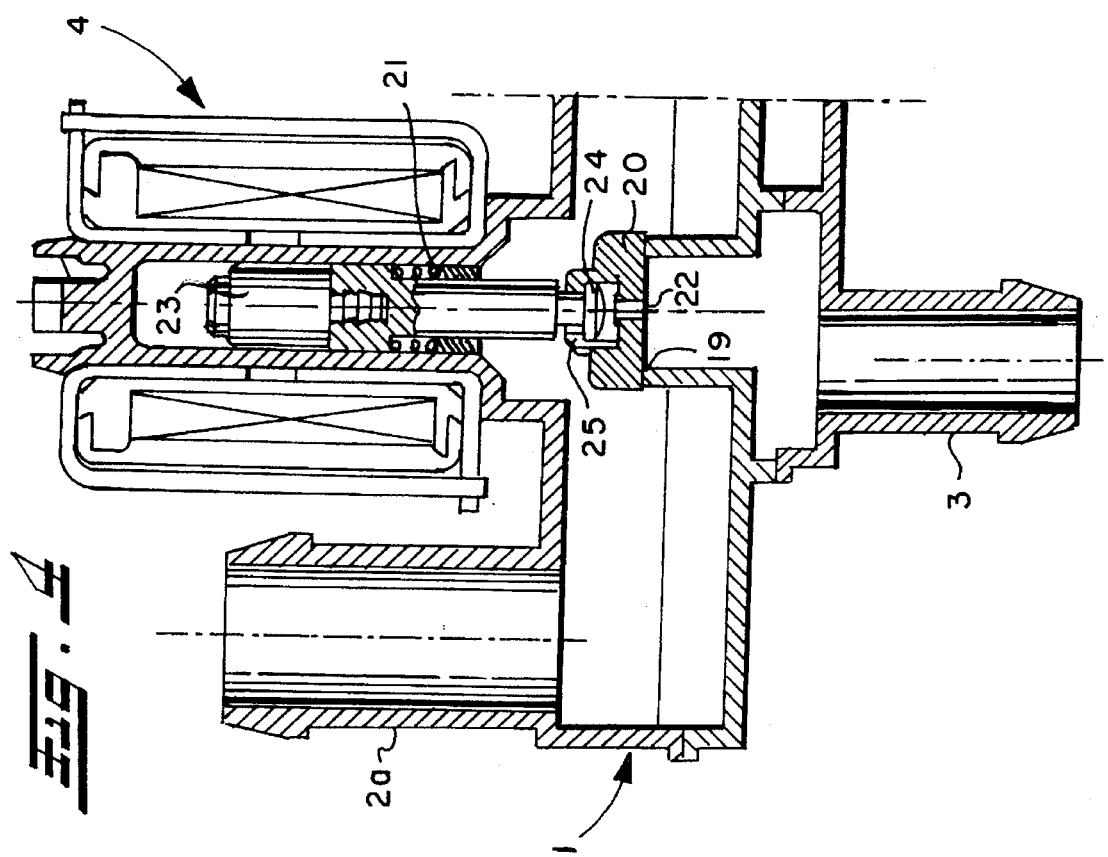
FIG. 4 is a similar view to that of FIG. 3, showing a different operating position.
Figure 5:
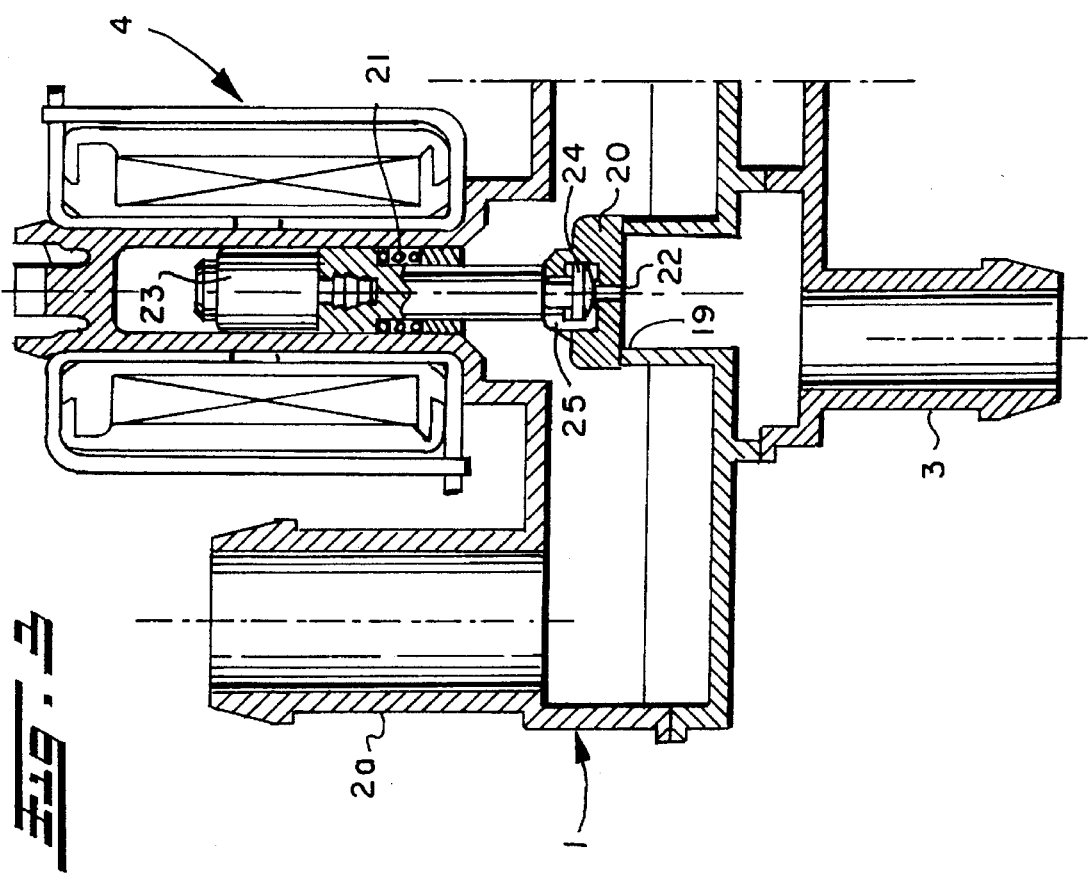

In order to overcome this drawback, it is proposed as shown in FIGS. 3 and 4, to provide a small opening 22 on the axis of the element 20, by providing through the element 20 a hole 22 having a diameter on the order of 1 mm., for example. Additionally, the moving core or armature 23 of the electrical valve 4 has a head 24 provided on the lower end thereof operative to seal the entrance of the opening 22 (see FIG. 3) or to move away from it slightlyin lost-motion movement with respect to element 20, the head 24 being retained inside a cavity provided on the element 20 in the region of the mentioned opening 22. In the cavity wall there is provided at least one channel 25 enabling the cavity to communicate with the inside of the distributor body 1.

Therefore, when the normally open electrical valve 4 is in the energized or closed position and is de-energized, i.e., is no longer fed by an electric current, the moving core 23 of the latter tends to move upwardly and return to a rest position under the action of the return spring 21, which initially only has to overcome the force resulting from the residual pressure exerted on the cross-section of the small opening 22, which has a much smaller cross-section than that of the opening 19. The head 24 of the moving core 23 then disengages slightly from opening 22 (see FIG. 4) and allows a small flow of water to pass through the channel 25 and the opening 22 towards the outlet 3. Therefore, a drop in the residual pressure is obtained, and the force required to displace the sealing element 20 decreases and can be exerted without difficulty by the return spring 21. The assembly of the electrical valve 4 can then return to the rest position, namely to the open position.

Such an element having a small hole therethrough can also be provided on the normally closed electrical valves 5a, 5b and 5c, but in this case the resulting advantage is not quite so important, because, in order to return the water distributor to its normal operation, it will be necessary to energize the electrical coils in the valves with an electric current.

It will be noted that in the case of a water distributor provided with two or more inlets, such as inlets 2a, 2b and 2c in the embodiment shown, the distributor can also be used as a mixer, one inlet being for hot water, for example, and the other inlet for cold water.

It is obvious that the invention is not limited to the embodiment of a distributor for a liquid as described above by way of example only; on the contrary, it encompasses all the possible variations and applications within the scope of the inventive principle. Namely, it will fall within the scope of the invention:

to modify the number of inlets and outlets for the liquid, to provide any arrangement for the normally open electrical valves and/or the normally closed electrical valves, to associate with the inputs for the liquid, ordinary valves or safety valves controlled by any means whatsoever, to add to the distributor, a control or safety means of any type, to use the distributor for liquids other than water, in equipment or installations of any kind.

Although the present invention has been described hereinabove with respect to the illustrated embodiments, it will be understood that the invention is capable of modification and variation and is limited only by the scope of the following claims.

We claim:

1. A distributor assembly for controlling fluid flow in an appliance comprising:

(a) a manifold having an inlet with a line valve controlling flow to a valving chamber having a plurality of outlets;

(b) an outlet valve disposed to control flow to one of said outlets and having a valve member moveable between an open and closed condition and including means biasing said member to the open condition, said biasing means including a member having limited lost motion with respect to said valve member and operable to open a pilot passage through said valve member in the closed condition for reducing pressure in said valving chamber and permitting said biasing means to open said valve; and, a normally closed outlet valve disposed controlling to individually control flow, to each of the other of said plurality of outlets.

2. The assembly defined in claim 1, wherein said outlet valves are electrically operated.

3. The assembly defined in claim 1, wherein said outlet valves are solenoid operated.

4. The assembly defined in claim 1, wherein said means operable to open a pilot passage includes a solenoid armature having an end portion received in a hollow formed in said valve member.

5. The assembly defined in claim 1, wherein said normally open outlet valve member is formed of elastomeric material.

6. The assembly defined in claim 1, wherein said manifold has a plurality of inlets with a line valve disposed for controlling flow individually to each of said inlets.

7. A method of distributing liquid from a supply to an appliance comprising:

(a) providing a manifold having an inlet with an electrically operated line valve and a valving chamber communicating with a plurality of discharge outlets;

(b) valving each of said plurality of outlets individually with an electrically operated direct acting valve capable of opening against manifold pressures not greater than a predetermined level;

(c) opening said line valve and pressurizing said chamber at supply pressure and:

(i) where supply pressure is less than said predetermined level, selectively opening said outlet valves for flow to the desired outlets, (ii) where supply pressure is greater than said predetermined level, closing said line valve and bleeding chamber pressure through a pilot passage in one of said valves until chamber pressure drops to said predetermined level and opening desired ones of said outlet valves and re-opening said line valve.

8. A distributor assembly for controlling fluid flow in an appliance comprising:

(a) a manifold having at least one inlet having an electrically operated line valve communicating with a main chamber which commuinicates with a plurality of separate outlet chambers, with each outlet chamber having at least one discharge outlet communicating therewith;

(b) an electrically actuated outlet valve disposed to control flow from the main chamber to each of said outlet chambers, wherein one of said outlet valves is normally open and is pilot operated with the others of said outlet valves being normally closed, said normally closed outlet valves being of the direct acting type, wherein said at least one normally open valve has a solenoid operator with a moveable armature urged to the valve open position by a spring having a valve member or poppet moveable therewith for valving flow to the respective outlet chamber, the valve member having a restricted pilot flow passage therethrough and said armature has a head portion operable upon limited lost motion movement with respect to said valve member to open said pilot passage thereby permitting flow therethrough, said spring operative to effect said lost motion movement in the event of excessive pressure in said main chamber when said normally open valve is closed.

* * * * *

UNITED STATES PATENT AND TRADEMARK OFFICE
CERTIFICATE OF CORRECTION

PATENT NO. : 5,605,173
DATED : February 25, 1997
INVENTOR(S) : Gerard Arnaud

It is certified that error appears in the above-indentified patent and that said Letters Patent is hereby corrected as shown below:

Column 5, lines 41-42 delete "CONTROLLING".

Signed and Sealed this

First Day of July, 1997

*Attest:*

BRUCE LEHMAN

*Attesting Officer*  *Commissioner of Patents and Trademarks*